(No Model.)

D. O. EVEREST.
HARROW TOOTH HOLDER.

No. 400,397. Patented Mar. 26, 1889.

Witnesses:
Walter S. Wood
John H. Chase

Inventor.
David O. Everest
By Lucius C. West
Att'y.

UNITED STATES PATENT OFFICE.

DAVID O. EVEREST, OF PINE GROVE, ASSIGNOR OF ONE-HALF TO THE WILLIAMS MANUFACTURING COMPANY, OF KALAMAZOO, MICHIGAN.

HARROW-TOOTH HOLDER.

SPECIFICATION forming part of Letters Patent No. 400,397, dated March 26, 1889.

Application filed January 14, 1889. Serial No. 296,337. (No model.)

*To all whom it may concern:*

Be it known that I, DAVID O. EVEREST, a citizen of the United States, residing at Pine Grove, county of Van Buren, State of Michigan, have invented a new and useful Improvement in Harrow-Tooth Holders, of which the following is a specification.

This invention relates to devices for holding harrow-teeth and shares in a manner to be adjusted in relation to the depth of cut, and it has for its object the below described and claimed construction, substantially as set forth.

Figure 1:
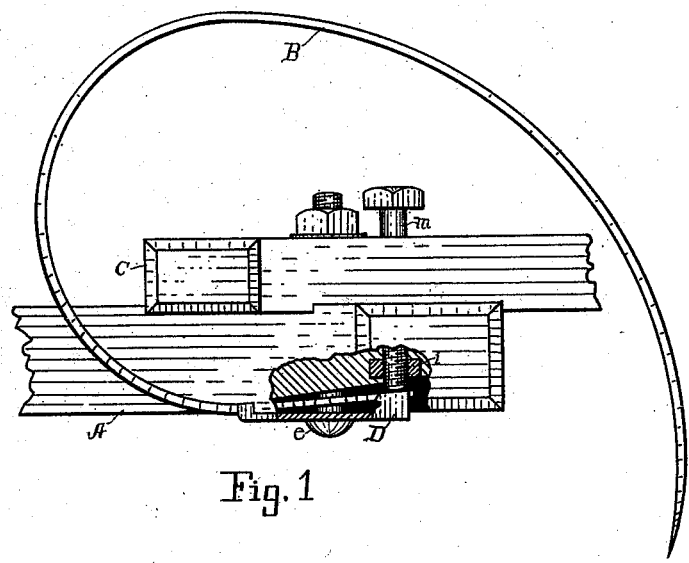
Figure 2:
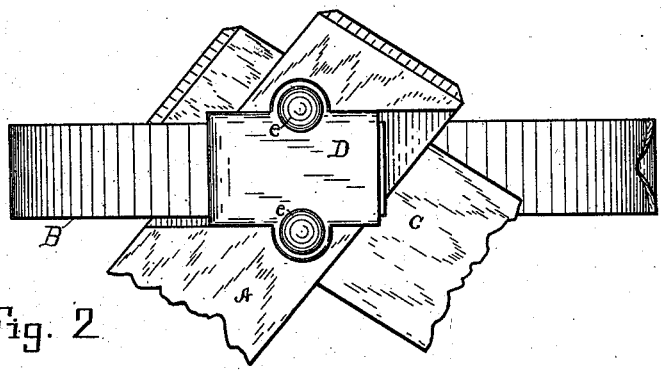
Figure 3:
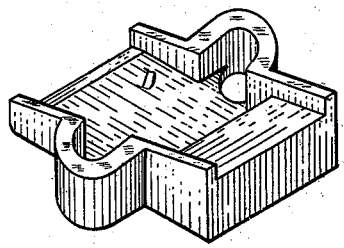

In the drawings forming a part of this specification, Figure 1 is a side elevation of the holder and tooth, parts being broken away and the crossed tooth-beams in perspective. Fig. 2 is an under plan view of Fig. 1, and Fig. 3 is an enlarged perspective of the holder.

Referring to the lettered parts of the drawings, A C are the crossed beams of the ordinary style of float harrow-frames, but so far as the holder is concerned the beams may be crossed or not, as desired. The under side of the beam A, to which the tooth B is attached, has a mortise or recess deeper at one end than the other, as shown in black in Fig. 1, and in this recess is placed a casting, D, wedge-shaped, the thickest end being in the deepest end of the recess in the tooth-beam, Figs. 1 and 3. The shank of the tooth is placed between the casting D and the beam A in the recess. The casting or plate D is clamped to the beam by the side bolts, *e e*, passed up through the plate and beam.

At *m* is a screw-bolt or set-screw passed down through the beam, and when said beam is wood the screw-bolt is passed through a nut or screw-threaded block embedded in the beam or attached thereto, the idea being illustrated at I, Fig. 1, so as to screw the bolt *m* farther in or farther out. The lower end of the bolt *m* contacts with the tooth at the rear end of the shank.

In the operation of raising the cutting-point of the tooth the screw-bolt *m* is raised and the clamping-bolts *e e* are set tighter. To lower the point of the tooth, the bolts *e e* are loosened and the screw-bolt set farther down.

Having thus described my invention, what I claim, and desire to secure by Letters Patent of the United States, is—

1. The combination of a tooth-beam, a binding-plate, bolts attaching said plate to the beam, and a screw-bolt passed through the beam, and a tooth between the end of the screw-bolt and the plate, whereby the tooth and plate are adjusted, substantially as set forth.

2. The combination of the tooth-beam having the wedge-shaped recess, a tooth or share, a wedge-shaped plate, side bolts attaching said plate to the beam, and a screw-bolt passed through the beam for adjusting the tooth and plate, substantially as set forth.

In testimony of the foregoing I have hereunto subscribed my name in presence of two witnesses.

DAVID O. EVEREST.

Witnesses:
P. MACDUFF,
EUGENE SCOTT.